H. HEUSER.
PROCESS OF MALTING.
APPLICATION FILED OCT. 17, 1908.
1,041,282.
Patented Oct. 15, 1912.
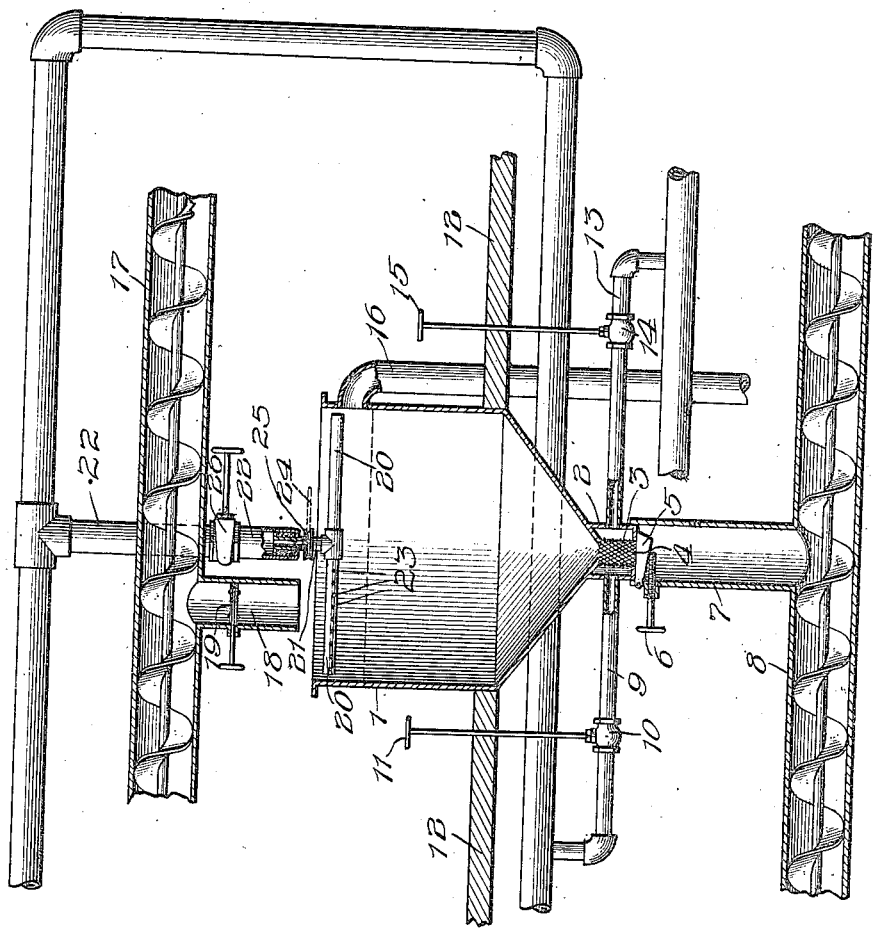
Witnesses:
Inventor:
Herman Heuser,
By Luther L. Miller
Atty.

UNITED STATES PATENT OFFICE.

HERMAN HEUSER, OF CHICAGO, ILLINOIS.

PROCESS OF MALTING.

1,041,282.   Specification of Letters Patent.   Patented Oct. 15, 1912.

Application filed October 17, 1908. Serial No. 458,196.

*To all whom it may concern:*

Be it known that I, HERMAN HEUSER, a citizen of the United States, residing at Chicago, in the county of Cook and State of Illinois, have invented a new and useful Improvement in the Process of Malting, of which the following is a specification.

My invention relates to the first step in the manufacture of malt, to wit, the steeping of the grain. As heretofore practised, the mass of grain to be steeped has been submerged in water for the necessary length of time, usually in the neighborhood of fifty hours. During this period the water is changed, say, three times. It will thus be seen that the process just referred to leaves the grain in contact with a given body of water for a prolonged period of time, whereby the water becomes rich in extracted grain substances, particularly after the grain has begun to soften, and therefore a most fertile field for the development of the micro-organisms adhering to the grain. Said micro-organisms impart to the steeped grain a bad odor known in the art as the "steeped-grain smell." Furthermore, the water becoming acid through the growth of micro-organisms therein, the vitality of the grain is injuriously affected by the extraction of useful substances from the grain by the water.

The object of my invention, generally stated, is to conduct the steeping operation in such a way as not only to avoid such injury to the grain as is above alluded to, but also to improve the final product by thoroughly cleansing and purifying the grain.

The accompanying drawing illustrates one form of apparatus which may be used in practising my invention, Figure 1 being a diagrammatic view of the apparatus, Fig. 2 a detail plan view of a spraying device, and Fig. 3 a section through said device.

In the drawing, 1 indicates a steep tank which may be of any suitable form. As herein shown, the body of the tank is substantially cylindrical and has a conical lower end which communicates with a casing 2 containing a cylindrical strainer 3. In the lower end of the casing 2 is an outlet opening 4 for the steeped grain, said opening being arranged to be closed by a valve 5 that is operated by a hand wheel 6. A tube 7 connects the outlet 4 with a conveyer 8 of any suitable form. Water may be admitted to the steep tank 1 through a supply pipe 9 communicating with the casing 2, said pipe having a valve 10 therein which is provided with means, such as a hand wheel 11, whereby the valve may be conveniently operated from the floor 12. A waste-water pipe 13 also communicates with the casing 2 and leads to a drainage system of any suitable form. In the pipe 13 is a valve 14 having an operating hand-wheel 15.

16 is an over-flow pipe connected with the upper portion of the steep tank 1, and in practise leading to a separator for the skimmings and the water.

Any preferred means may be used for charging the tank 1 with grain, as, for example, a screw conveyer 17 leading from a grain bin (not shown) and provided with a discharge spout 18. The flow of grain through said spout may be controlled in any suitable way, as by a slide 19.

I provide a means for spraying water on the mass of grain in the steep tank 1, said means in the present embodiment being a spraying head 20 rotatably supported in a suitable way, as by means of the central tubular stem 21, said stem having a rotative bearing in the lower end of a water-supply pipe 22. The ends of the head 20 are closed and in one side of each branch of said head is a series of perforations 23, said perforations being inclined so as to discharge the water angularly against the grain in the tank 1. The perforations in one branch are in the side opposite to the perforated side of the other branch. It will, therefore, be seen that, if the water pressure be sufficient, the discharge through the perforations in the head 20 will cause the latter to be rotated. If desired, the head 20 may be positively rotated by suitable means, as, for example, a belt 24 running over a grooved pulley 25 on the stem 21.

26 is a valve in the water-supply pipe 22.

Assuming the grain outlet valve 5 and the valves 14 and 26 to be closed, my process may be carried out as follows: A suitable quantity of water is admitted to the steep tank 1 through the pipe 9 by opening the valve 10, after which said valve is again closed. Grain is then introduced into the tank 1 by means of the conveyer 17. The valve 10 is then opened for the admission of water into the steep tank to produce an over-flow through the pipe 16 for the usual length of time, thereby enabling the operator to skim off the light grain and foreign seeds usually contained in the grain to be malted, the skimmings passing out through the pipe 16. After the skimmings have been removed, the valve 10 is closed. When the grain shows the first visible signs of softening (usually about ten hours from the beginning of steeping, the length of time depending upon the temperature of the steep water and the character of the grain) the valve 14 is opened and the steep water drawn off through the pipe 13, the valve 14 being permitted to remain open. Water is now sprayed upon the body of grain in the tank 1 by opening the valve 26. In the rotation of the spraying head 20 a relatively small quantity of water is continuously sprayed upon the surface of the mass of grain, the water trickling through the grain and leaving the tank through the pipe 13. When the spraying device herein shown is used, the spray is approximately in the form of a sheet impinging upon the surface of the body of grain and traveling over said surface in a circuit. The entire surface of the body of grain is uniformly sprayed. The whole mass of grain is thoroughly and uniformly steeped, the dust and micro-organisms and other impurities being continually washed off the grain. It will be seen that the same water does not remain in contact with the grain, and hence does not afford the micro-organisms an opportunity to develop. The kernals in the upper part of the body of grain being likely to germinate, (particularly toward the end of the steeping operation) unless kept from contact with the air by a film of water, I preferably continue the spraying without interruption from the time it is begun until the steeping is completed. The passage of the water upward through the tank, as described, for the purpose of floating off the light grain and foreign seeds may be dispensed with, if desired, and the spraying begun as soon as the grain is charged into the tank, or the spraying may be commenced as soon as the skimmings have been removed. When the grain has been softened to the proper degree, the valve 26 is closed, and after the water passing through the tank 1 has drained through the pipe 13, the valve 5 is opened to discharge the steeped grain from the tank through the tube 7 and the conveyer 8. The conveyer 8 may, however, be dispensed with, and the grain removed from the tank 1 by flooding, in which event the steeping process is concluded by steeping for a brief time, say, about an hour, in still water.

The process herein described thoroughly softens and cleanses the grain and conserves its vitality, and is of particularly great value during warm weather and in the malting of grain of decreased vitality, such as old or damaged grain.

The value of my process in the case of old or damaged grain will be readily appreciated when it is remembered that such grain imparts to the steep water more bacteria and mold fugi and a greater amount soluble grain substance than does grain in good condition, and that such excessively charged steep water injuriously affects the already low vitality of the grain.

It will be understood that the apparatus herein described has been illustrated merely to aid in explaining the process, that the process may be practised with other apparatus, and that the process is susceptible of modification by those skilled in the art without departing from the spirit of the invention.

I claim as my invention:

1. In the art of steeping grain in the manufacture of malt, the step of passing water through the body of grain until the grain is substantially softened, said water passing through the body of the grain forthwith without accumulation.

2. In the art of steeping grain in the manufacture of malt, the step of discharging water upon the whole exposed surface of the body grain until the grain is substantially softened so as to moisten and wash all of the kernels with substantial uniformity, said water passing through the body of the grain forthwith without accumulation.

3. In the art of steeping grain in the manufacture of malt, the step of passing through the body of grain water descending upon the exposed surface of the body of grain and trickling with substantial uniformity through said body until the grain is substantially softened.

4. In the art of malting, steeping the grain in both still water and in water descending upon the whole surface of the body of grain and forthwith passing through the body.

5. In the art of malting, steeping the grain alternately in still water and in water descending upon the whole surface of the body of grain and forthwith passing through the body.

6. In the art of malting, steeping the grain in still water, and further steeping the grain with substantial uniformity in trickling water.

7. In the art of malting, steeping the grain alternately in still water and in water sprayed upon the whole surface of the body of grain and trickling through the body.

8. In the art of malting, steeping grain by allowing the grain to remain in a given body of water until the grain shows the first signs of softening, and then steeping and washing the grain free from undesirable matter in trickling water.

9. In the art of malting, steeping grain by allowing the grain to remain submerged in a given quantity of water until the grain shows the first signs of softening, and then washing the grain free from undesirable matter in water descending through the body of grain, the water forthwith leaving the body of grain.

HERMAN HEUSER.

Witnesses:
GEORGE L. CHINDAHL,
C. PAUL PARKER.